United States Patent
Fridental et al.

(10) Patent No.: US 10,366,122 B2
(45) Date of Patent: Jul. 30, 2019

(54) METHODS CIRCUITS DEVICES SYSTEMS AND FUNCTIONALLY ASSOCIATED MACHINE EXECUTABLE CODE FOR GENERATING A SEARCHABLE REAL-SCENE DATABASE

(71) Applicant: ANTS TECHNOLOGY (HK) LIMITED., Wanchai (HK)

(72) Inventors: Ron Fridental, Shoham (IL); Ilya Blayvas, Jerusalem (IL)

(73) Assignee: ANTS TECHNOLOGY (HK) LIMITED., Wanchai (HK)

( * ) Notice: Subject to any disclaimer, the term of this patent is extended or adjusted under 35 U.S.C. 154(b) by 489 days.

(21) Appl. No.: 15/264,627

(22) Filed: Sep. 14, 2016

(65) Prior Publication Data

US 2018/0075142 A1 Mar. 15, 2018

(51) Int. Cl.
*G06F 16/00* (2019.01)
*G06F 16/783* (2019.01)
(Continued)

(52) U.S. Cl.
CPC .......... *G06F 16/783* (2019.01); *G06F 16/211* (2019.01); *G06F 16/70* (2019.01); *G06F 16/7867* (2019.01); *G06F 21/6254* (2013.01); *G06K 9/00* (2013.01); *G06K 9/00744* (2013.01); *G06T 7/246* (2017.01); *G10L 15/02* (2013.01);
(Continued)

(58) Field of Classification Search
CPC ...... G06F 16/783; G06F 16/70; G06F 16/211; G06F 16/7867; G06F 16/246; G06F 21/6254; G06F 3/015; G06F 3/017; G06F 3/013; G06T 7/246; G06T 2207/10016; G10L 15/18; G10L 15/02; G10L 15/25; G10L 15/26; G10L 25/48; H04N 7/181;
(Continued)

(56) References Cited

U.S. PATENT DOCUMENTS

| | | | | |
|---|---|---|---|---|
| 2005/0196020 A1* | 9/2005 | Comaniciu | ........ | G06K 9/00805 382/104 |
| 2007/0153091 A1* | 7/2007 | Watlington | .............. | H04N 7/15 348/208.14 |
| 2011/0093820 A1* | 4/2011 | Zhang | ...................... | A63F 13/06 715/863 |
| 2012/0001925 A1* | 1/2012 | Andonieh | ............. | G06F 9/5083 345/502 |
| 2012/0039539 A1* | 2/2012 | Boiman | ................. | G11B 27/28 382/195 |
| 2013/0021483 A1* | 1/2013 | Bennett | ................... | H04N 19/56 348/208.4 |

(Continued)

*Primary Examiner* — Anh Ly
(74) *Attorney, Agent, or Firm* — Soroker Agmon Nordman

(57) ABSTRACT

This application discloses to methods, circuits, devices, assemblies and systems for generating a searchable real-scene database including records indicating entities and physical events occurring within the real-scene. The said system may include a camera feed interface to receive a camera feed from each of one or more cameras observing the real-scene. It may also include image processing circuitry including a static scene analysis unit to: (a) extract features of entities appearing in a camera feed, (b) recognize entity types of entities appearing in the one or more camera feeds, (c) assign an entity designator to a specific entity appearing in the camera feeds, (d) generate an entity designator record for a uniquely identifiable entity, and ∈ generate an attribute record for a uniquely identifiable entity. The system may also include a scene dynamics analysis unit to: (a) detect entity movements, (b) detect entity speech, (c) characterize entity actions based on detected entity movement and/or entity speech, and (d) generate a record indicting an action taken by an entity.

15 Claims, 8 Drawing Sheets

(51) Int. Cl.
  *G06F 16/21*   (2019.01)
  *G06F 16/78*   (2019.01)
  *G06F 21/62*   (2013.01)
  *G06K 9/00*    (2006.01)
  *G10L 15/02*   (2006.01)
  *G10L 15/18*   (2013.01)
  *G06T 7/246*   (2017.01)
  *G06F 16/70*   (2019.01)
  G10L 15/26    (2006.01)
  G10L 25/48    (2013.01)

(52) U.S. Cl.
  CPC .... *G10L 15/18* (2013.01); *G06T 2207/10016* (2013.01); *G10L 15/26* (2013.01); *G10L 25/48* (2013.01)

(58) Field of Classification Search
  CPC .. G06K 9/00744; G06K 9/00; G06K 9/00765; G06K 9/00771; G06K 2009/00738
  See application file for complete search history.

(56) References Cited

U.S. PATENT DOCUMENTS

| | | | |
|---|---|---|---|
| 2013/0044129 A1* | 2/2013 | Latta | G09G 5/00 345/633 |
| 2014/0270482 A1* | 9/2014 | Chakraborty | G06K 9/00221 382/154 |
| 2015/0268822 A1* | 9/2015 | Waggoner | G06F 3/04842 715/722 |
| 2016/0109954 A1* | 4/2016 | Harris | G06F 3/017 345/156 |
| 2016/0110433 A1* | 4/2016 | Sawhney | G06F 16/9535 707/722 |
| 2016/0378861 A1* | 12/2016 | Eledath | G06K 9/00718 707/766 |
| 2016/0379373 A1* | 12/2016 | Givon | G06T 7/20 382/103 |
| 2017/0124848 A1* | 5/2017 | Zhou | G08B 21/22 |
| 2018/0018508 A1* | 1/2018 | Tusch | G06K 9/00771 |
| 2018/0314689 A1* | 11/2018 | Wang | G06F 17/2785 |

* cited by examiner

METHODS CIRCUITS DEVICES SYSTEMS AND FUNCTIONALLY ASSOCIATED MACHINE EXECUTABLE CODE FOR GENERATING A SEARCHABLE REAL-SCENE DATABASE

FIELD OF THE INVENTION

The present invention generally relates to the fields of computer vision and visual tracking. More specifically, the present invention relates to methods, circuits, devices, assemblies, systems and functionally associated computer executable code for generating and managing a searchable real-scene databased which database may include records of entities and physical events relating to the entities appearing in the real-scene, wherein the real-scene databased is at least partially based on data generated by a computer vision system configured to perform entity and physical event detection on camera feeds from the real-scene.

BACKGROUND

A variety of systems have been developed to assist people in identifying, monitoring, tracking and/or locating objects in spaces such as the home and office. Fairly common examples are key holders that respond to a clap of one's hands by emitting an audible signal, and portable telephones with a handset unit that rings when paged from the base unit. The prior art also offers some more elaborate computer-implemented techniques for tracking and managing items, but they require manual registration of items to be tracked.

Accordingly, there remains a need for solutions that may facilitate the generation and operation of a searchable real-scene databased including searchable records relating to entities and physical events appearing in the real-scene, wherein the database records may be derived from the optically tracking entities such as humans, animals and objects appearing in a video camera from the real-scene.

SUMMARY OF INVENTION

The present invention relates to methods, circuits, devices, assemblies, systems and functionally associated computer executable code for generating a searchable real-scene-database, also referred to as a scene-play or scene-transcript. A searchable real-scene-database according to embodiments of the present invention may include descriptors of entities appearing in the real-scene, past and present, and physical events occurring in the real-scene, also past and present, wherein the terms entity or entities may refer to a person or persons, an animal or animals, and/or other type of objects appearing in the scene. The term physical event may include actions taken by or occurring to an entity or entities (e.g. child walked across room, man says "hello Timmy" to child, elderly person falls on floor, etc.). The term physical events may also include scene changes in or to elements or features visible in the real-scene (e.g. lighting in a room dims, object fell, etc.). A real-scene, also sometimes referred to just "a scene", according to embodiments of this application may be defined by a physical area or location covered by a single video camera or may it may be composed of multiple physical areas or locations covered by a set of video cameras.

A searchable real-scene-database, according to embodiments of the present invention, may receive and may include data of multiple types or domains, also referred to as multi-domain data, such as for example: (a) video feed segments from one or more camera feeds from cameras covering the real-scene, (b) recorded audio segments from cameras covering the real-scene, (c) data records describing entities and physical events appearing in the real-scene, and (d) data records describing relationships between entities appearing in the real-scene. A searchable real-scene-database, according to further embodiments of the present invention, may be generated by image processing circuitry configured to auto-detect and/or auto-register specific entities, specific physical events and/or specific relationships (e.g. meta-tagging audio/video records and/or generating descriptor records) visible in camera feeds from the real-scene, wherein auto-detecting and/or auto-registering may include cross-correlation of scene acquired and/or scene derived multi-domain data records.

According to some embodiments, generating a searchable real-scene-database may include the steps of: (1) receiving one or more camera feeds from cameras monitoring a real-scene; (2) processing the one or more camera feeds from the real-scene in order to: (a) detect and characterize scene elements appearing in the scene camera feeds, (b) detect, extract and characterize attributes of entities visible in the scene camera feeds (c) identify specific entities visible in the scene camera feeds, and (d) detect, extract and characterize actions taken by or upon entities visible in the scene camera feeds; and (3) organizing and storing: (a) segments of camera feeds, (b) scene characterization information, (c) characterization information relating to attributes of entities appearing in camera feeds, (d) an inventor of entities appearing in a camera feeds, and (e) characterization information relating to real-scene physical events occurring in the scene (e.g. actions taken by or events occurring to entities appearing in the camera feeds).

Attributes of entities, also referable to as entity attributes, may include: (a) visual characteristics (e.g. appearance of one or more entity portions), (b) visual signatures (unique vector produced from hashing entity image), (c) acoustic characteristics (sounds emitted), (d) acoustic signatures (unique characteristics of emitted sounds), unique identity of entity (John, Julie, Benjie the dog, etc.), relational characteristics relative to other entities and relative to various scene elements (Hierarchical relationships and other types of interconnections). Actions taken by or occurring to entities may include: (a) movements, (b) movements of specific types (e.g. walk, run, jump, sit, throw, etc.), (c) transformations (e.g. change of state, change of clothing, change of hair, etc.), (d) linking or interconnecting with other entities and/or scene elements, and (e) speaking with or at other entities and/or scene elements.

According to embodiments, a system for generating a searchable real-scene database may include an entity detector to detect entities appearing within a camera feed. The detector may also perform functions such as attribute extraction of entity attributes and entity classification or characterization. The detector may be functionally associated with an entity type/classification reference database or data-store, which database or data-store may store references of entity attributes and other reference parameters usable for auto-detecting entities and/or auto-classifying entities, using computer vision processing inspection of one or a series of frames of a camera feed, as specific entity types or specific classes of entities. The reference parameters in the database or data-store may include geometric descriptor of parts of specific entity types or classes. The geometric descriptors may be absolute and/or relational in nature, and they may include values either in the space or frequency domains. The reference parameters may also include color parameters and/or basic motion parameters of respective entity types with which they are associated. According to embodiments of the present invention, entities detected in a camera feed, along with their respective extracted attributes and classifiers, may be provided or presented by the detector for automated identification and further analysis, to other processing units of the invention, for example to an entity identifier unit.

According to embodiments, a system for generating a searchable real-scene database may include an entity identifier unit, which entity identifier unit may include or be otherwise functionally associated with a digital inventory or database for storing digital records relating to extracted entities, which records may correspond to entities detected and extracted from the real-scene camera feed(s) in the past and/or present. The entity identifier unit may be comprised of dedicated processing hardware, and/or at least a portion of general purpose processing hardware configured using machine executable code, to perform image processing in accordance with embodiments of the present invention.

According to embodiments, the entity identifier unit may generate a unique entity designator, such as a system number or code, for each specific entity appearing within, and extracted from, the camera feed(s), past or present. Each unique entity designator may be associated with one or more attribute records containing characterization information the respective corresponding specific entity. The one or more associated attribute records may include information such as: (a) an indicator of the entity's type (e.g. species, gender, object type, etc.) (b) an image sample of the entity's appearance, (c) a visual signature of the entity's appearance, (d) a model of the entity's appearance, (e) a model of the entity's motion dynamics, (f) a copy of the entity's acoustic signature, (g) real-scene designation for the entity, (h) relationships (e.g. hierarchical) with other entities, etc.). Each time an entity appears in a feed, is extracted from the camera feed, and is presented to the entity identifier unit, the entity identifier unit may use extracted attributes of the presented entity to attempt to find a match with an entity designator already stored in the digital inventory or database. If a match to an existing specific entity designator is not found, a new entity designator record may be generated. Additionally, the extracted attributes of the entity may be recorded as attribute records associated or otherwise linked with the newly generated entity designator record.

When extracted attributes of the presented entity match or correlate to a sufficient level with attribute records of an entity designator already stored in the digital inventory or database matching process, the identifier unit may identify the presented entity as a match to the existing specific entity designator it found, thereby identifying the presented entity from the feed as the one in the matched records. Additionally, the freshly extracted attributes of the presented entity may be used to update or otherwise augment attribute records related to the existing/matched specific entity designator. According to further embodiments, should two separate sets of attribute records, each set associated with a separate entity designator, become sufficiently similar or otherwise correlated over time, for example, as the sets are updated or augmented, the matching algorithm may at some point determine that the separate sets are related to the same specific entity and that the two specific entity designators are actually referring to the same entity (e.g. person). Accordingly, the identifier unit, or another functionally associated processing module, may merge or otherwise link the two separate entity designators and their respective entity attribute records.

A real-scene or real-world identifier (e.g. a person's actual name or actual relationship to another entity) may be assigned or registered to a system entity designator, for example as an attribute record, according to one of several methods. A user of the system has the option of manually registering with the system images of themselves, other people or animals, and even objects. As part of manually registering the user may define attributes such as names and relationships to other entities. According to further embodiments, living entities, such as people or animal, may be automatically assigned real-scene identifiers (e.g. names) based on how other entities address or otherwise refer to them in a camera feed. As a system according to embodiments of the present invention may include audio processing capabilities, for example in the form an audio processing circuits capable of speech to text processing. And since a system according to embodiments may include an entity action characterizer, the system may detected when a first entity is addressing or referring to another entity and may detect by which name or phrase the first entity refers to the other. As a detection of which name was used to address or refer to a specific entity, the system may assign or otherwise link, for example as an attribute record, the used and detected name to the entity designator of the specific entity, available for subsequent search.

Likewise, according to some embodiments, relationships between two entities may be detected based on detected action/interactions between entities. These relationships between entities may also be stored, for example as an attribute record for one or both of the entities in the relationship. The relationship may be between: (a) a person and an object, such a John and his phone; (b) two objects, such as the phone is on the table or placed in the jacket; and/or (c) between two persons, such as John and daughter Katie. Each of these types of relationships, along with many other possible relationship types, may be detected and then recorded for subsequent search by a system according to embodiments.

A system according to embodiments may include a scene dynamics analysis unit including processing circuits, dedicated circuits and/or programmed processors, for detecting and characterizing actions occurring (motion and/or speech) within a video camera feed from a scene. The scene dynamics analysis unit may receive a camera feed, along with related entity designators of entities present in the feed, and may process the scene camera feed using spatiotemporal processing algorithms adapted to perform functions such as entity motion detection, entity sound characterization, entity action type characterization and/or entity relationship characterization functionality. Results from these processes may be used to generate and/or augment existing attribute records for entities appearing in the camera feed, and/or to generate physical event records for the scene, including entity action records relating to entities within the scene. The longer a system according to embodiments of the present invention monitors a scene, the more information is collected about individual entities and the more complete the searchable scene dataset may become.

Objects appearing within a scene being monitored by a system according to embodiments of the present invention may be auto-registered upon a first detection of the objects by the system, wherein auto-registration may include assigning a unique entity designator, generating an attribute record for the entity designator indicating one or more visually detectable parameters of the designated object and/or an entity type of the designated object. Auto-registration of an object may also include generating attribute records indicating relationships between the object and other entities already registered in the system. When the attribute record describes a relationship relative to a living entity (e.g. person), the specific relationship types indicated by the record(s) may include: (a) held by, (b) used by, (c) owned by, (d) worn by, etc. When the attribute record describes a relationship between the object and another object, the specific relationship types indicated by the record(s) may include: (a) on top of, (b) inside of, (c) containing (counterparty to inside of), and (d) etc.

A system according to embodiments may extrapolate relationships between entities by detecting interactions, physical events/actions, between the entities. An entity relationship characterizer according to embodiments may receive entity motion/action characterization information relating to an interaction between two or more entities and may extrapolate from the type of entities involved and the type of interaction detected a relationship type between the two entities. For example, detection by the system, through action detection and characterization modules, that a specific living entity is wearing a shirt or pants may trigger the system to generate one or more event records indicating the wearing of the pants or shirt by the living entity. However, detection of recurring wearing or carrying by a living entity of an object, such as a shirt, pants or a wallet, may cause the entity relationship characterizer to generate an attribute record for the living entity indicating an ownership relationship with the object. The entity relationship characterizer may likewise generate an attribute record for the object entity indicating an ownership (i.e. owned by) relationship with the living entity.

The earlier described rule based methodology for detecting a relationship between a living entity and an object entity, and generating corresponding attribute records, is only one of many possible heuristically based approaches. Many other rule sets, based on heuristics relating to various interactions between related entities of various types, may be compiled and used by a relationship characterizer in order to extrapolate relationship between entities appearing with the camera feeds of the scene. The relationship characterizer may receive a set of action characterizations relating to two or more entities, and if the action characterizations meet comply with a rule set associated with a given relationship type, the relationship characterizer may generate an indicator, such as an attribute record, indicating the given relationship between the two or more entities.

A system according to embodiments of the present invention may include data storage to store both raw audio/video data from camera feeds and data records generated one or more of the audio/video processing blocks. There may be provided digital storage for an entity inventory database which includes records of entities detected and/or identifier with the video feeds. There may be provided digital storage for storing entity attribute records indicating attributes of entities detected in the scene, including such attributes as entity locations and relationships/dependencies between entities identified within the scene. There may be provided digital storage to store records including characterization information relating to physical events, such as entity actions and scene occurrences, detected within the real-scene.

According to embodiments of the present invention, there may be provided one or more data record parsing, indexing and storing modules. The module may index and cross-index (e.g. link) records (e.g. entity designators, entity attributes and physical event records) associated with concurrent or otherwise related physical events and/or related entities and/or with raw audio/video data segments from which the entity and event records were generated. For example, the modules may store a record generated by an entity identifier along with a cross-index or link to a raw audio/video data recorded from which the camera feed segment from which the record was generated. Generated entity attribute records, physical event records and or entity relationship record generated from the same camera feed segment may also be cross-indexed or linked to the at least some of the same records and data. A system according to embodiments may store data in a multi-domain (i.e. multimedia types) database or group of databases with cross-indexed or cross-linked records. Accordingly, records of different types but relating to a common situation or scenario within a scene may be readily found, read and interpreted together.

A system according to embodiments of the present invention may include a scene data query engine to allow a user to query database records associated with the real-scene being tracked and characterized according to embodiments. The query engine may have access to some or all of the raw data storage and some or all of the database record storage integral or otherwise functionally associated with a system according to embodiments of the present invention. The query engine may parse and/or interpret a scene related query, issued by a user of the system, and may find/retrieve one or more scene-related records matching the parsed query.

A user query received by the query engine may include terms associated with one or more entities and/or one or more physical events which may have occurred in the scene. The query may relate to a last detected/recorded location within the scene of an entity and/or detected physical event, such as when a specific entity performed a specific action. According to certain embodiments, a natural language processor may parse and convert natural language questions into database searchable terms and query structure. Parsing and/or interpreting may include expanding using text based query terms (e.g. entity designator, entity types, event types, etc.) to lookup associated synonyms, attributes and/or otherwise related terms (e.g. related entities) to be used in searching through database records, optionally using an index, for entities, related attributes and physical events detected from the real-scene. Parsing and/or interpreting may include converting text based query terms and/or their synonyms, attributes or related terms (e.g. related entities) into data samples (e.g. audio samples, images, video samples, simulation models, etc.) to be compared with stored audio/video segments. Database searches according to the present invention may be cross-domain and/or iterative, such that the results of one search may be used as an input of a subsequent search of the same or another database table or data store.

According to further embodiments, the scene data query engine may be integral or otherwise functionally associated with a real-time scene query interface. The real-time scene query interface may be used for searching the real-scene in real-time for a specific entity, entity type and/or event type designated in a user query about the scene. The real-time scene query interface may include or be otherwise connected to a controller which may control one or more camera/video feed source-cameras. Some of the source feed cameras may be electrically controllable, electrically rotatable and/or electrically movable (e.g. robot or drone) by the controller. The real-time scene query controller may be functionally associated with and may receive information directly from a scene element analysis unit and/or a scene dynamics analysis unit, which units may process camera feeds from the cameras being controller by the real-time scene query controller. The controller may also access existing real-scene records. The controller may control the one or more cameras in accordance with an algorithm which interprets and attempts to respond to a scene related query by using the cameras to acquire real-time scene information. The controller may also optionally use existing real-scene records, for example in order to constrain, refine and/or optimize a search procedure pattern for a specific entity based on the last database record indicating a last detected location of the entity.

Embodiments of the present invention include a system for generating a searchable real-scene database including records indicating entities and physical events occurring within the real-scene. The system may include a camera feed interface to receive a camera feed from each of one or more cameras observing the real-scene. It may also include image processing circuitry having a static scene analysis unit to: (a) extract features of entities appearing in a camera feed; (b) recognize entity types of entities appearing in the one or more camera feeds; (c) assign an entity designator to a specific entity appearing in the camera feeds; (d) generate an entity designator record for a uniquely identifiable entity; and (e) generate an attribute record for a uniquely identifiable entity. The image processing circuitry may also include a scene dynamics analysis unit to: (a) detect entity movements; (b) detect entity speech; (c) characterize entity actions based on detected entity movement and/or entity speech; and (d) generate a record indicting an action taken by an entity. The scene dynamics analysis unit may be further adapted to detect and record a relationship two or more between entities based on detected interactions between the two or more entities. The system may generate an identifier and link it to an entity designator of a specific entity based on natural language processing of speech spoken by another entity addressing the specific entity.

The system may further include a scene data controller including: (a) cross domain digital data storage devices adapted to store data of various types and data records indicating various physical events and entities appearing in the stored data; and (b) a cross domain digital data storage controller adapted to index and log data records into said digital data storage devices. The scene data controller may include a scene data query engine to search and retrieve records from said digital data storage in accordance with a user query received through a system user interface. The scene data query engine may be adapted to search and retrieve records from said digital data storage in accordance with a user query received through a private system user interface. The scene data query engine may be adapted to search and retrieve records from the digital data storage in accordance with a user query received through a public user interface. The public user interface may be functionally associated with an abstractor to abstract or otherwise generifying user queries received through said public user interface. The public user interface may be functionally associated with anonymizer to anonymize or otherwise generifying system responses to user queries received through said public user interface.

A system according to embodiments may include a real-time scene query interface to receive a user scene query to be resolved using real-time camera feeds. The interface may be integral or otherwise functionally associated with a real-time scene query controller to invoke and control one or more scene camera(s) while assessing at least one output from said scene analysis units in accordance with a user scene query. The controller may include camera control logic to perform a scan of the real-scene with the one or more camera(s) in order to resolve the user scene query. The camera control logic may be adapted to use scene related data records stored in said digital data storage in order to focus the scan of the real-scene when attempting to resolve the user scene query. Failure to resolve a received user scene query using scene data records stored in the digital data storage may trigger use of the real-time scene query interface. The real-time scene query controller may be further adapted to invoke one or more search assisting robot(s) functionally associated with the system to move around and acquire video information from the real-scene according to patterns intended to resolve the user scene query.

The system by further include an audio processor adapted to characterize sound and speech generated by entities within the real-scene. The audio processor may be adapted to perform natural language processing on speech generated by a first entity interacting with a second entity. The audio processor may be synchronized with an entity action detector. The audio processor may be adapted to detect a name used by the first entity when referring to the second entity. The audio processor may provide a detected name for generating an attribute record for the second entity.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
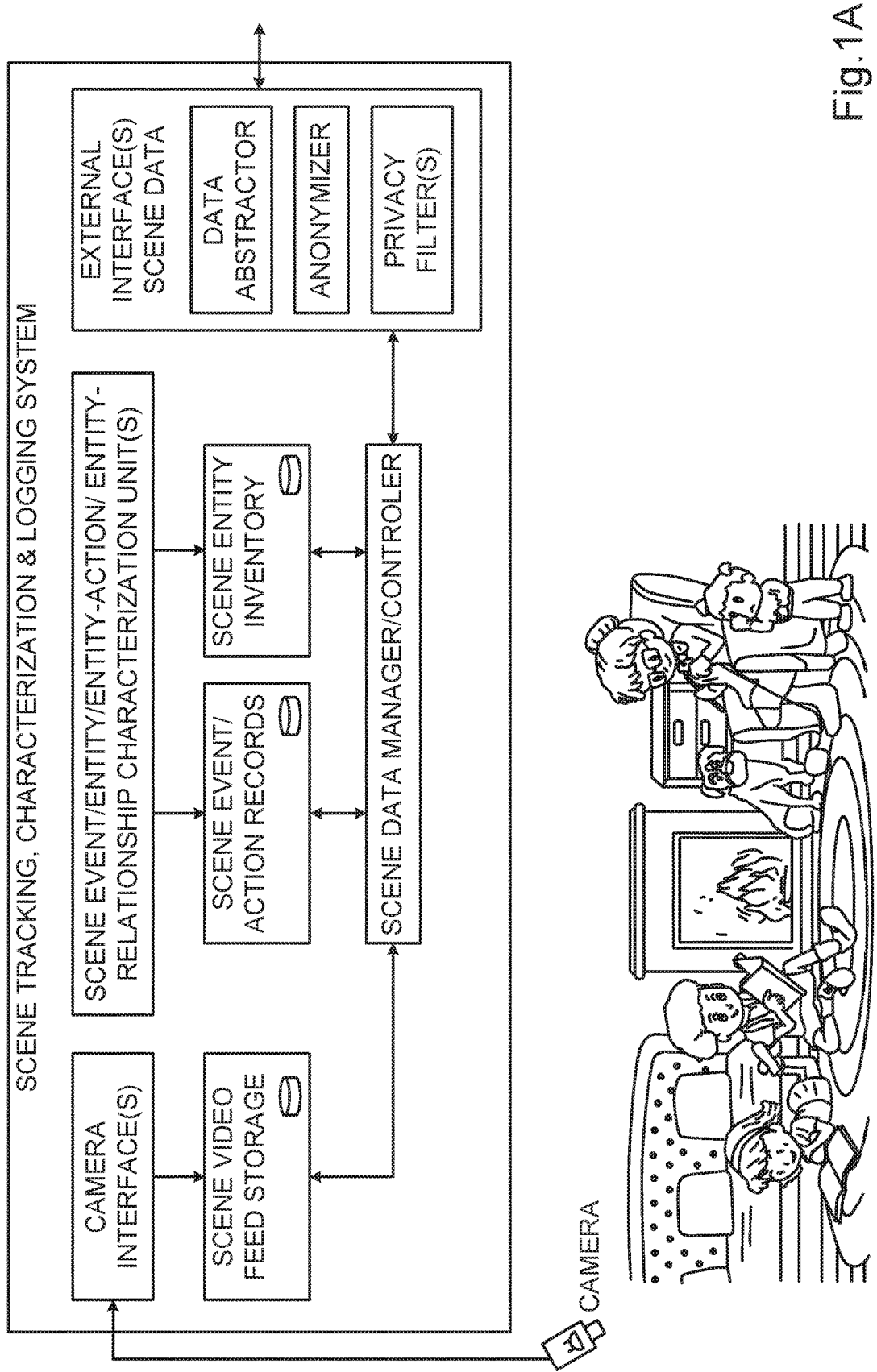
FIG. 1A is an illustration including a functional block diagram of an exemplary system for tracking a residential scene, detecting and characterizing entities and events within the scene, and recording/logging data records of scene characterizations, in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like. Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The present invention includes methods, circuits, devices, systems and machine executable code for generating a searchable real-scene database of events and entities appearing in the real-scene. According to some embodiments, there may be provided a system adapted to identify persons, animal and/or objects (also referred to as entities) within a field of view of at least one of one or more cameras functionally associated with the system. According to further embodiments, there may be provided a scene manager/controller which may receive, parses and logs identified events to one or more integral, connected or otherwise functionally associated databases. The scene data manager/controller may also include both private and public interfaces to the functionally associated databases, wherein the public interface may include or otherwise pass through a data abstractor, a data anonymizer and/or a privacy filter.

Figure 1B:
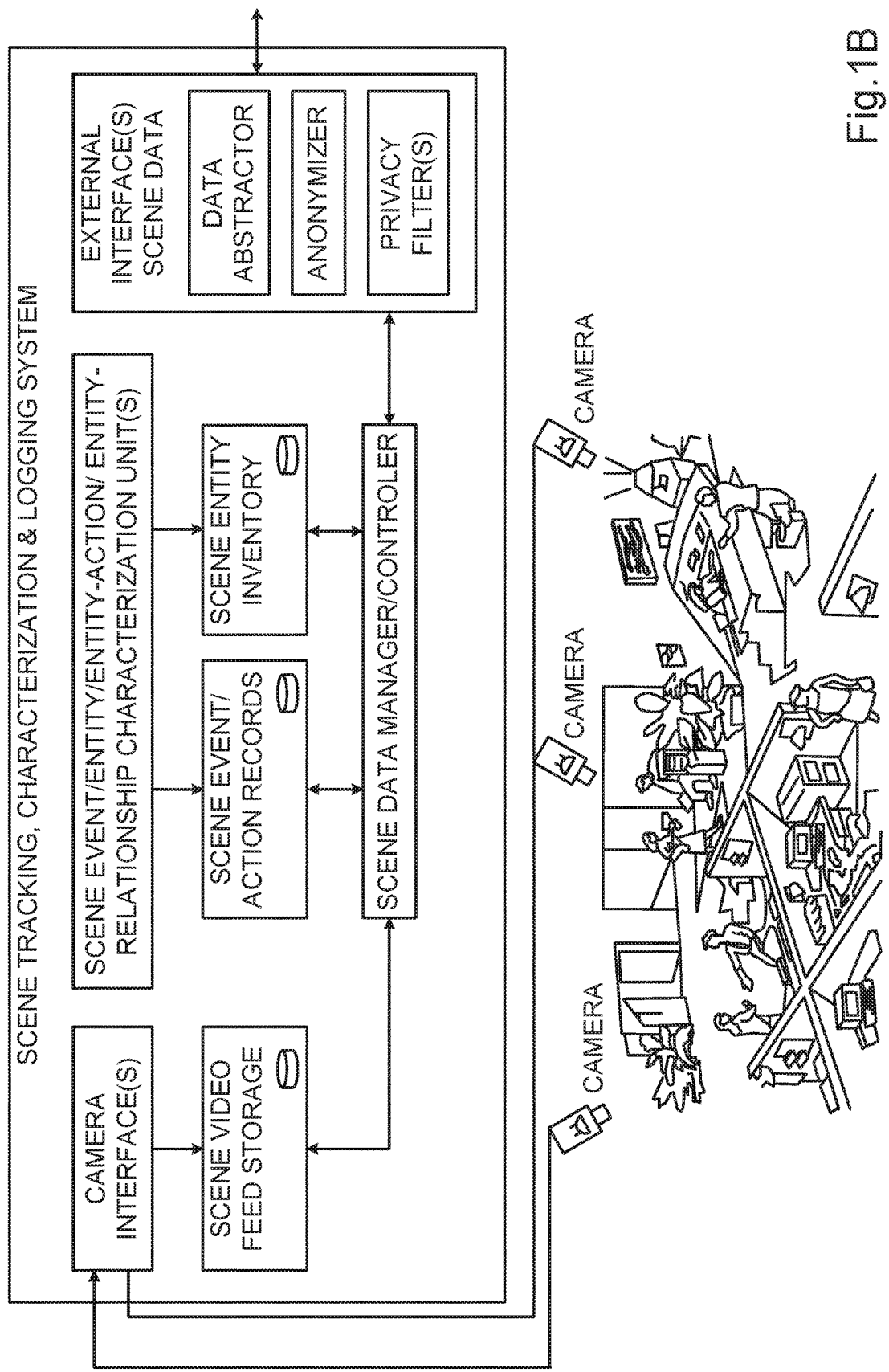
FIG. 1B is an illustration including a functional block diagram of an exemplary system for tracking a commercial/office scene, detecting and characterizing entities and events within the scene, and recording/logging data records of scene characterizations, in accordance with embodiments of the present invention.

Turning now to FIG. 1A, there is shown a scenario illustration including a functional block diagram of an exemplary system for automated tracking and recording of a residential scene in accordance with embodiments of the present invention. The system includes raw camera/video feed storage and circuits adapted for automated detection and characterization of entities and events appearing within the camera/video feed from of the scene. The system includes a scene data manager/controller for indexing and recording/logging data records of detections and/or characterizations of entities and events occurring within the scene, in accordance with embodiments of the present invention. The system includes an external interface for querying scene extracted data including video and/or records containing scene event and entity appearances. The external interface includes a data abstractor, an anonymizer and a privacy filter. FIG. 1B shows a similar system configured for use in a commercial office environment and connected to multiple cameras.

Figure 2A:
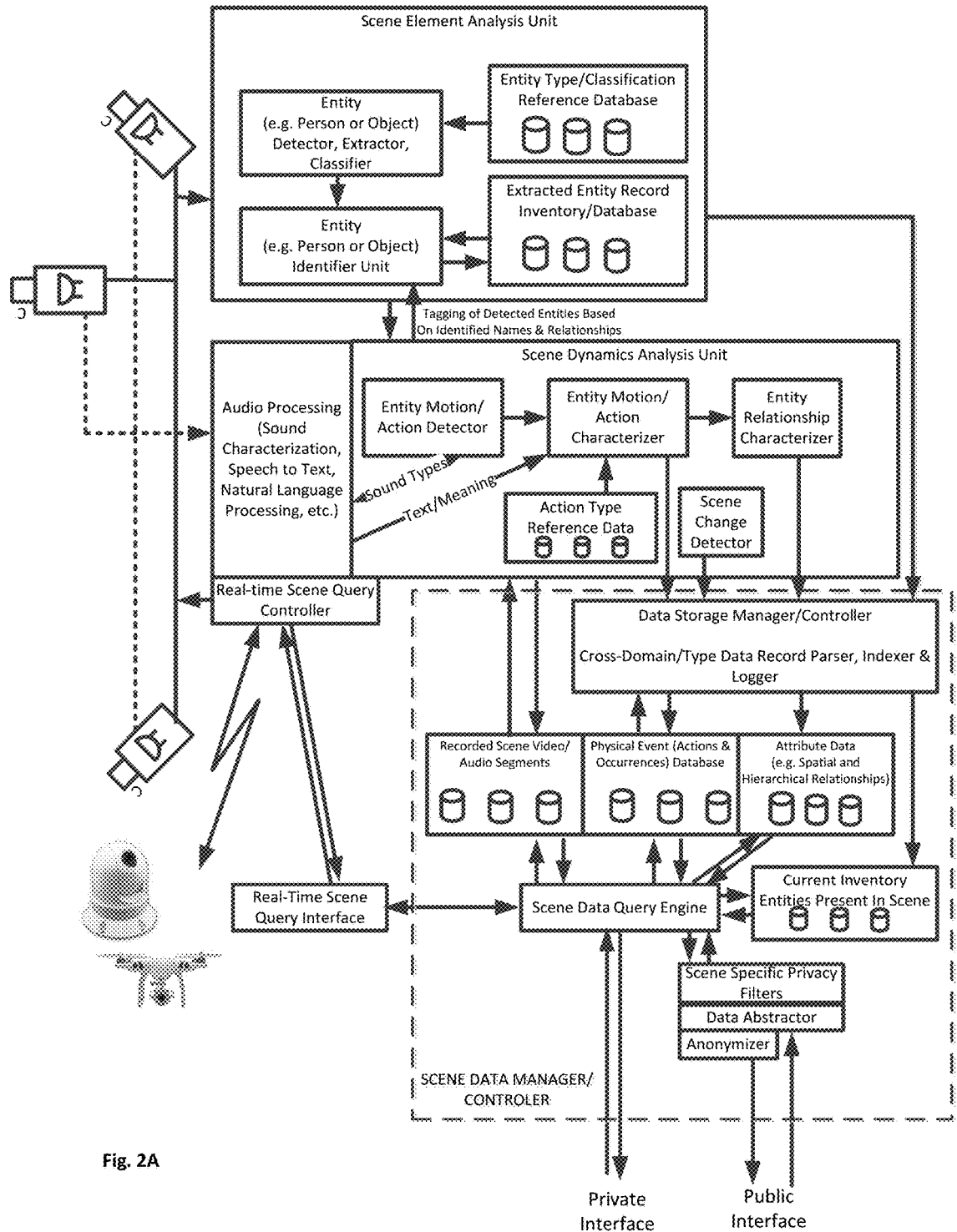
FIG. 2A is a block diagram showing an exemplary system for generating a searchable real-scene database in accordance with some embodiments of the present invention.
Figure 2B:
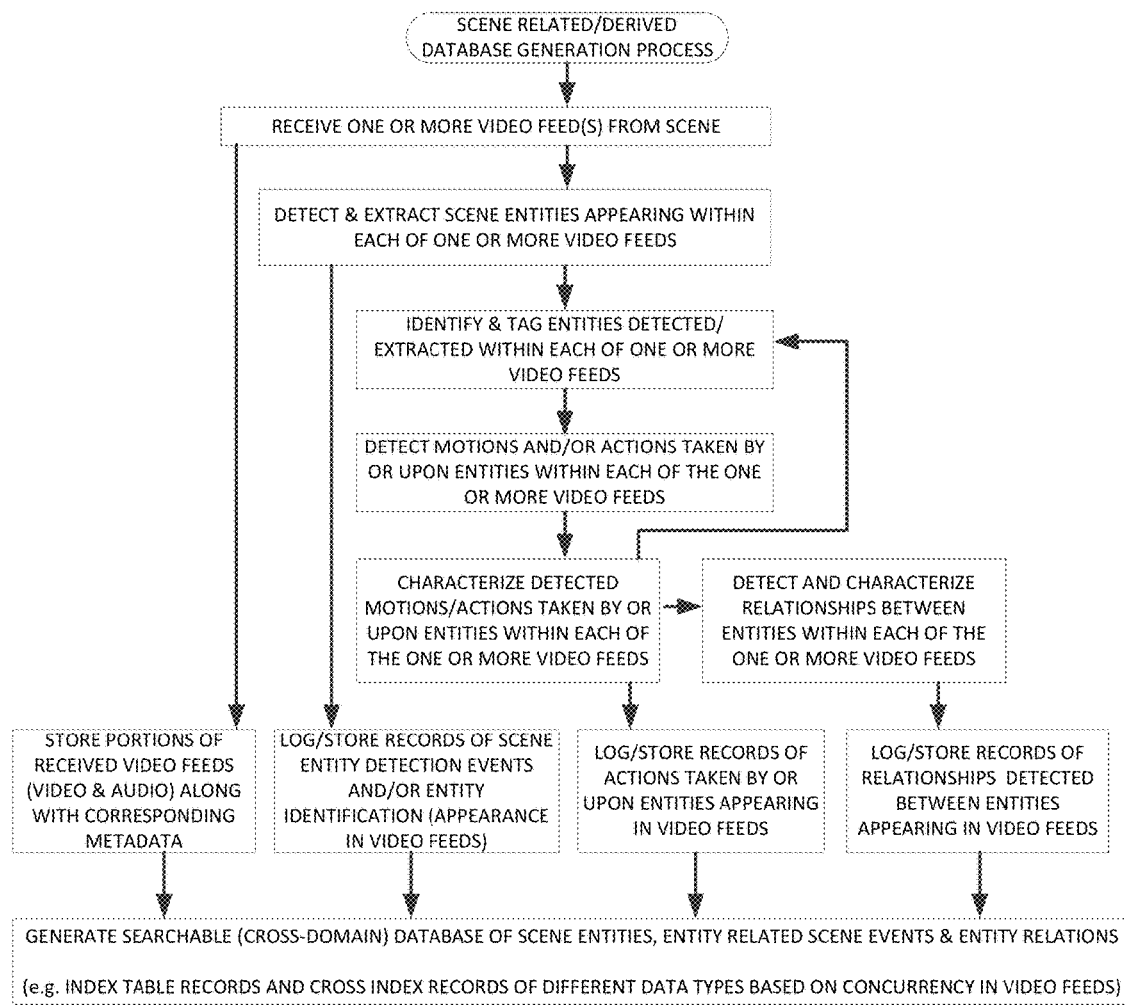
FIG. 2B is a flowchart showing the steps of an exemplary process for generating a real-scene database according to embodiments of the present invention.
Figure 2C:
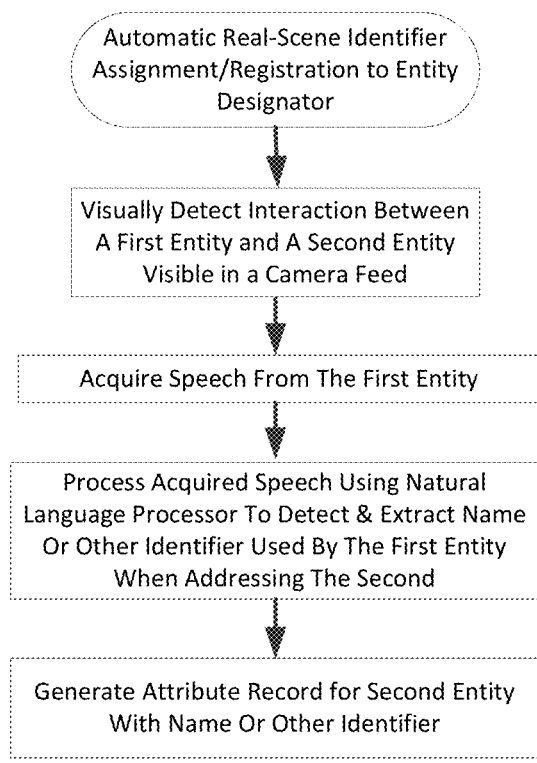
FIG. 2C is a flowchart showing the steps of an exemplary process for auto-tagging or auto-linking a real-scene (real-world) identifiers to a designator of an entity extracted from a video feed in accordance with some embodiments of the present invention.

Turning now to FIG. 2A there is shown a functional block diagram of a system for generating a searchable real-scene database according to embodiments of the present invention. FIG. 2B shows a flowchart including steps which may be implemented by a system as shown in FIG. 2A. FIG. 2C is a flowchart including steps which may be implemented by a system as shown in FIG. 2A when assigning real-scene indicators or names to entities appearing in video feeds in accordance with embodiments of the present invention. Operation of the system of FIG. 2A may be described with reference to the steps shown in the flowcharts of FIGS. 2B and 2C.

According to embodiments as shown in FIG. 2A, the system comprises an entity (e.g. Person, Animal or Object) detector and extractor for detecting entities in, and extracting entities from, one or more camera feed(s). The detector/extractor detects one or more entities appearing within at least one of one or more video feeds generated by at least one of one or more functionally associated cameras when or after an entity passes through a field of view of one or more of the functionally associated cameras. The entity detector/extractor may be functionally associated with an entity type classification reference database which may store and provide the detector/extractor visually detectable characteristics or parameters of one or more entity types, which parameters/characteristics may be visually static and/or dynamic. The entity detector/extractor may perform or cause image processing circuitry to algorithmically perform one or more feature detection and entity type classification processes at least partially based on records with the entity type classification reference database.

The system according to embodiments may also include an entity (e.g. Person, Animal or Object) identifier for specifically identifying one or more of the detected and extracted entities. The entity identifier may perform or cause image processing circuitry to perform detection processes configured to identify specific entities (e.g. Peter Smith, Rusty the Dog or Peter's hairbrush). The entity identifier may identify specific entities at least partially based on records stored within an extracted entity identifier database, which database may be dynamically updated and appended. The dynamically updated entity database of identifier entities may also be considered to a scene-inventory of all the entities which have passed through the real-scene. The dynamically updated entity database of identifier entities may also be used to generate a current real-scene inventory which includes indicators or records of entities which are currently present within the real-scene, and optionally a current location within the real-scene for each of the entities presently within the scene.

The system may also include an entity motion detector and an entity motion/action characterizer. The motion/action detector may detect movements in real-scene camera feeds indicative of an entity walking, running, talking, etc. The motion/action characterizer, integral or otherwise functionally associated with the motion/action detector, algorithmically characterizes the detected movement. The motion/action characterizer may be functionally associated with an action type reference data store which may include motion parameters and/or other reference data for characterizing detection motions as specific actions.

Based on an entity identifier/designator received from the entity identifier unit associates the characterized motion/action is associated with the identifier/designator of the entity which performed the motion/action. A record indicating a characterized motion/action by the designated/identifier entity is then stored in the scene-data storage. The motion/action characterizer may generate the record or may provide indicators of: (a) the identifier entity, (b) the detected and characterized action performed by the identified entity, and optionally (c) a time and location of the action to data storage manager/controller which may generate and store the record across one or more data stored.

The manager/controller may also index record and/or cross-index the record with a stored video segment from which the record was generated.

The system of FIG. 2A may further comprise, or be functionally associated with, an Audio Processing Unit for accessing audio feed(s) from the scene (e.g. from camera microphones, scene positioned microphones). The processing unit may be configured to detect and characterize physical events and/or entity identifiers from the audio feed(s), and to relay the indicators and/or identifiers to the functional blocks such as entity an identifier and to an action detector/characterizer. Deriving audio based physical event indicators and/or entity identifiers from camera audio feed(s) includes one or more of: (a) sound characterization, (b) speech to text, (c) natural language processing, (d) deep learning based classification, and/or (e) any other relevant techniques and methodologies known today or to be derived in the future. The audio processing unit may function in concert with the entity identifier, to identify specific entities, in accordance with the steps of FIG. 2C.

Further included in the system of FIG. 2A is an entity relationship detector/characterizer. The entity relationship detector/characterizer may detect spatial and/or hierarchical relationships between entities based on static entity detection results. The entity relationship detector/characterizer may also algorithmically detect other types of relationships between entities by recognizing patterns within repeating events or other actions occurring with and/or between the entities to be defined as having relations with one another.

The system of FIG. 2A also includes a Real-Time Scene Query Interface for facilitating in the resolution of scene related queries (e.g. scene inventory query, physical event query, etc.) unresolved based on previously stored data. The Real-Time Scene Query Interface is integral or otherwise functionally associated with a controller and functions to invoke query relevant cameras, and/or a robot assisted search, within the real-scene. The Real-Time Scene Query Interface may trigger and/or access real-time data (e.g. video) feeds, wherein triggered and accessed real-time data feeds may not be limited to a video feed, and may include any form of sensor feed, such as but not limited to: a microphone audio feed, a temperature/pressure/humidity/magnetic-field sensor feed, and/or the like.

The According system of FIG. 2A, there is also provide scene query engine for generating and relaying structured physical event queries to the event data store(s) (e.g. the Location/Position Specific Event Database) based on user inputs/inquiries received from one or more networked or otherwise functionally associated Interface(s), either Private or Public. The public interface is connected to the event query engine through a data abstractor, which data abstractor is adapted for and structuring public user inputs/inquiries, and further comprises an anonymizer for removing identities, names, associated numbers, and/or generally cleaning any potentially privacy infringing data from communications between the public Interface and the event query engine. A scene specific privacy filter is also shown as part of the public interface to the scene query engine.

Figure 3A:
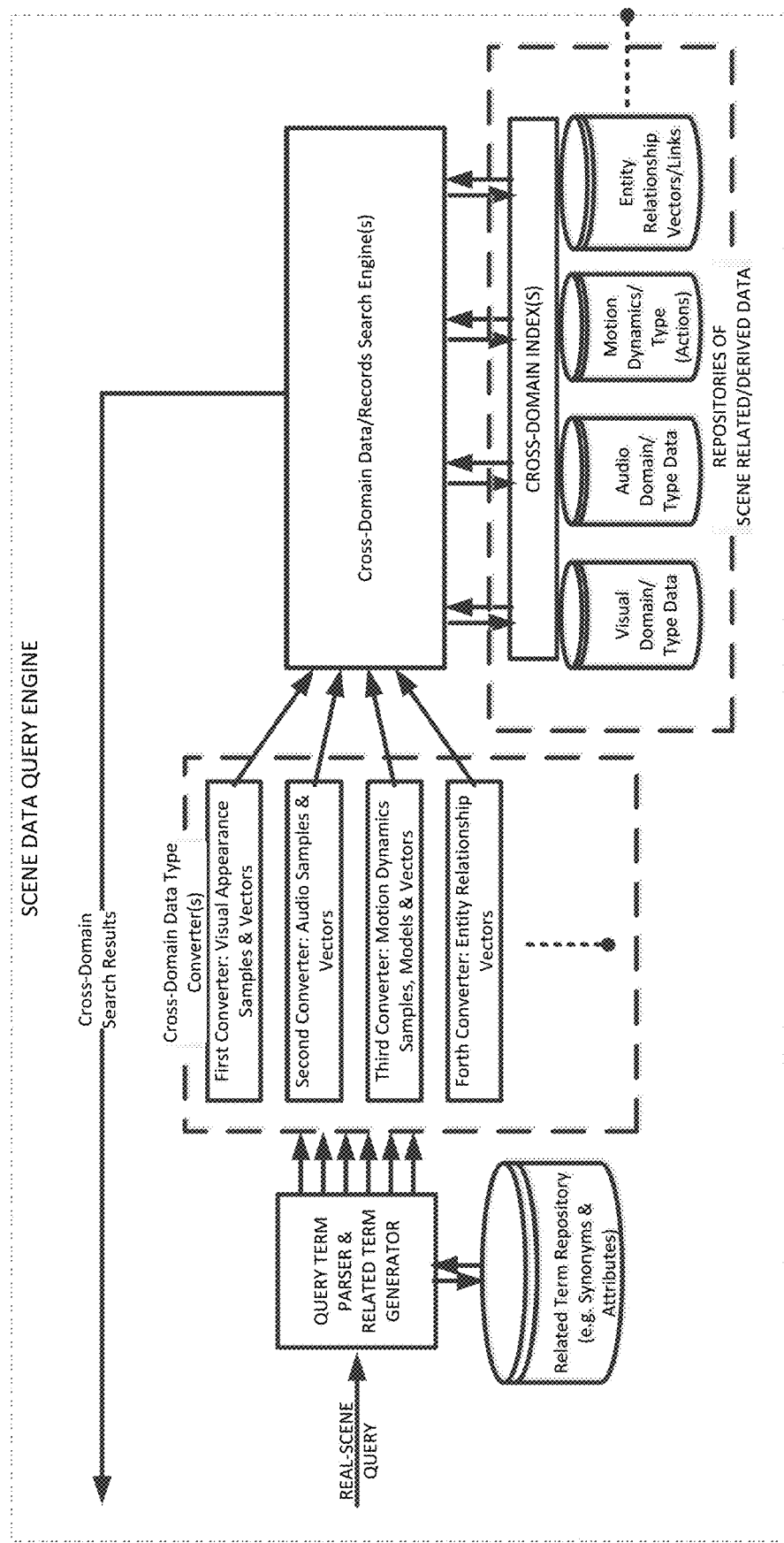
FIG. 3A is a functional block diagram of scene data query engine for searching cross domain/type data extracted from and otherwise relating to a real-scene in accordance with some embodiments of the present invention.
Figure 3B:
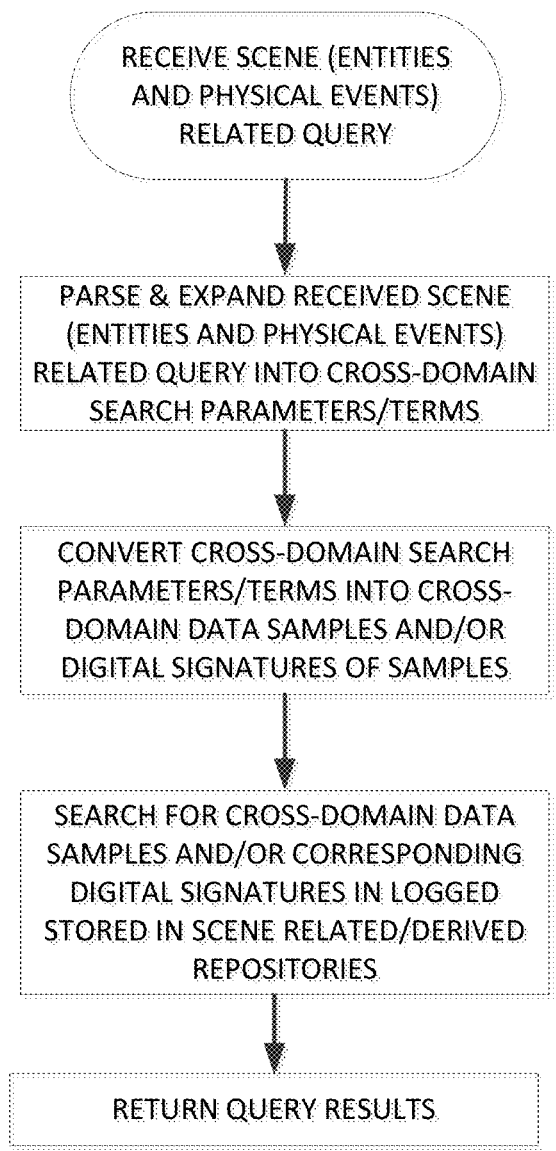
FIG. 3B is a flowchart showing the steps of a method for searching cross domain/type data which was extracted from and/or is otherwise related to a real-scene in accordance with some embodiments of the present invention.

Turning now to FIG. 3A there is shown a functional block diagram of an exemplary scene data query engine for searching cross domain/type data extracted from and otherwise relating to a real-scene in accordance with some embodiments of the present invention. FIG. 3B is a flowchart showing the steps of a method for searching cross domain/type data which was extracted from and/or is otherwise related to a real-scene in accordance with some embodiments of the present invention. The structure and operation of the scene data query engine of FIG. 3A may be described with reference to the steps of the flowchart of FIG. 3C. A query term parser may receive a scene related query and may expand on the query by accessing a related term repository, which repository may store synonyms, attributes and otherwise related terms for the scene related terms. According to some embodiments, the related term repository may store relationships between scene entities, which relationships may be dynamically updated by an entity relationship characterizer. Once the original scene query is expanded, some of the terms may also be used to reference and pull up digital samples relating to the term. For example, the term "dog" may be used to find a pull up, within a cross-domain data type converter, samples of sounds dogs may make, a picture of a dog, a video of dog, and/or a dynamic model of a dog's motion dynamics. Likewise, the term John may be used to find and pull up samples of John's voice, pictures of John, video of John and/or a dynamic model of John's motion dynamics. According to such embodiments, video and attribute records extracted by the system during previous appearances of John in camera feeds may be used to update records in the cross-domain data type converter.

A Cross Domain Data/Records search engine may use the expanded scene query terms and the extracted samples to run searches across multiple scene related data stores, wherein in the data stored may contain data of a different type or domain. For example, a first data store may store data from the visual domain, including still images and video segments. A second data store may store data from the audio domain, in the form of audio and speech samples, audio signatures and other data types representative of audio information. A motion dynamics digital data store may include mathematical models or simulations representing movements of entity types and/or specific entities (e.g. people, pets, etc.). The motion dynamics store may also include specific values representing certain motion attributes or motion dynamics (e.g. gait length or gate frequency, ratio of hip to knee flex, arm swing angle, etc.) of an entity type or specific entity. Another data store may include records indicating relationships between specific entities and/or between specific entity types.

Figure 3C:
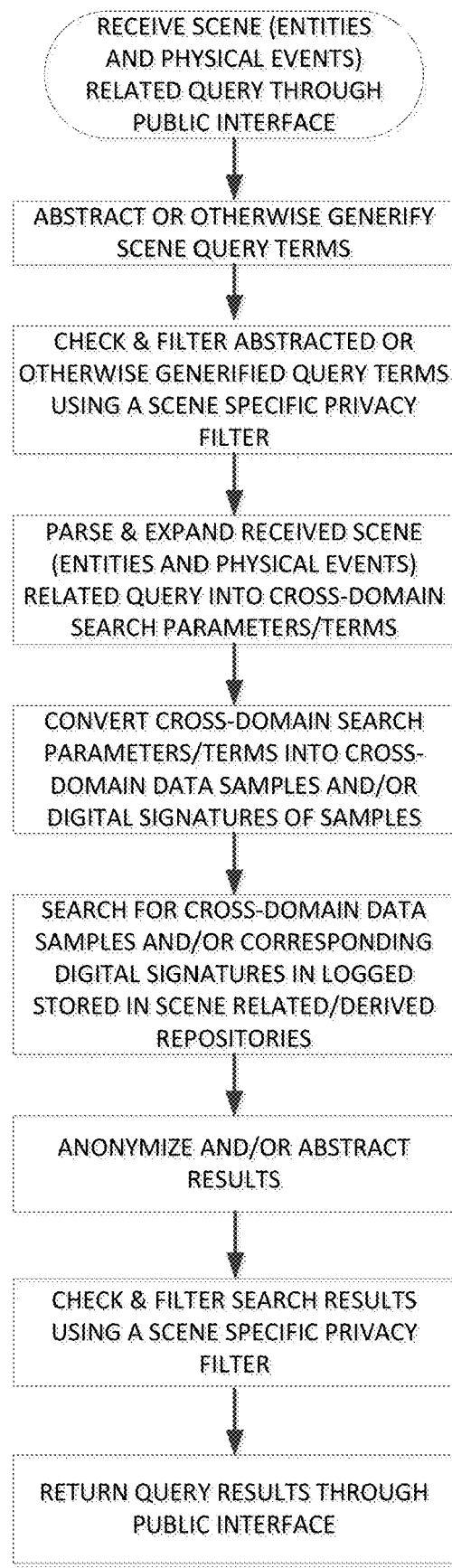
FIG. 3C is a flowchart showing the steps of an exemplary process for real-scene querying by through a public database interface, wherein query terms may be abstracted or otherwise mapped to generic scene related terms and query results are anonymized so as to maintain the privacy of the people whose real-scene is being queried.

Turning now to FIG. 3C, there is shown a flowchart including the steps of an exemplary process for real-scene database querying through a public database interface, wherein query terms may be abstracted or otherwise mapped to generic scene related terms and query results are anonymized so as to maintain the privacy of the people whose real-scene is being queried. The public interface based querying may also include some or all of the steps of a real-scene database query process performed through a private database interface in accordance with embodiments of the present invention.

The processes and displays presented herein are not inherently related to any particular computer, device, system or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for generating a searchable real-scene database including records indicating entities and physical events occurring within the real-scene, said system comprising:
 a camera feed interface to receive a camera feed from each of one or more cameras observing the real-scene;
 an image processing circuitry including:
 (1) a static scene analysis unit to:
  a. extract features of entities appearing in a camera feed;
  b. recognize entity types of entities appearing in the one or more camera feeds;
  c. assign an entity designator to a specific entity appearing in the camera feeds;
  d. generate an entity designator record for a uniquely identifiable entity;
  e. generate an attribute record for a uniquely identifiable entity;
 (2) a scene dynamics analysis unit to:
  a. detect entity movements;
  b. detect entity speech;
  c. characterize entity actions based on detected entity movement or entity speech; and
  d. generate a record indicting an action taken by an entity;
 a scene data query engine to search and retrieve records from said digital data storage in accordance with a user query received through a public user interface;
 a real-time scene query interface to receive a user scene query to be resolved using real-time camera feeds; and
 a real-time scene query controller to in invoke and control one or more scene camera(s) while assessing at least one output from said scene analysis units in accordance with a user scene query,
 wherein said controller includes camera control logic to perform a scan of the real-scene with the one or more camera(s) in order to resolve the user scene query and
 wherein said camera control logic is adapted to use scene related data records stored in said digital data storage in order to focus the scan of the real-scene when attempting to resolve the user scene query.

2. The system according to claim 1, wherein said scene dynamics analysis unit is further adapted to detect and record a relationship two or more between entities based on detected interactions between the two or more entities.

3. The system according to claim 1, wherein an identifier is generated and linked to an entity designator of a specific entity based on natural language processing of speech spoken by another entity addressing the specific entity.

4. The system according to claim 1, further comprising scene data controller including: (a) cross domain digital data storage devices adapted to store data of various types and data records indicating various physical events and entities appearing in the stored data; and (b) a cross domain digital data storage controller adapted to index and log data records into said digital data storage devices.

5. The system according to claim 4, wherein said scene data controller further comprises a scene data query engine to search and retrieve records from said digital data storage in accordance with a user query received through a system user interface.

6. The system according to claim 1, further comprising a scene data query engine to search and retrieve records from said digital data storage in accordance with a user query received through a private system user interface.

7. The system according to claim 1, wherein said public user interface is functionally associated with an abstractor to abstract or otherwise generifying user queries received through said public user interface.

8. The system according to claim 1, wherein said public user interface is functionally associated with anonymizer to anonymize or otherwise generifying system responses to user queries received through said public user interface.

9. The system according to claim 1, wherein failure to resolve a received user scene query using scene data records stored in the digital data storage triggers use of the real-time scene query interface.

10. The system according to claim 1, wherein said real-time scene query controller is further adapted to invoke one or more search assisting robot(s) functionally associated with the system to move around and acquire video information from the real-scene according to patterns intended to resolve the user scene query.

11. The system according to claim 1, further comprising an audio processor adapted to characterize sound and speech generated by entities within the real-scene.

12. The system according to claim 11, wherein said audio processor is adapted to perform natural language processing on speech generated by a first entity interacting with a second entity.

13. The system according to claim 12, wherein said audio processor is synchronized with an entity action detector.

14. The system according to claim 13, wherein said audio processor is adapted to detect a name used by the first entity when referring to the second entity.

15. The system according to claim 14, wherein said audio processor provides the detected name to generate an attribute record for the second entity.

* * * * *